United States Patent [19]
Boyer et al.

[11] Patent Number: 5,400,336
[45] Date of Patent: Mar. 21, 1995

[54] METHOD FOR CONTROLLING THE DELIVERY FROM CELLS

[75] Inventors: Pierre Boyer, Lannion; Fabrice Guillemin, Ploumanach; Michel Servel, Lannion, all of France

[73] Assignee: France Telecom, France

[21] Appl. No.: 998,121

[22] Filed: Dec. 29, 1992

[30] Foreign Application Priority Data

Jan. 14, 1992 [FR] France ................. 92 00430

[51] Int. Cl.$^6$ ............................................. H04J 3/14
[52] U.S. Cl. .................... 370/94.1; 370/60; 370/60.1; 370/61
[58] Field of Search ............ 370/94.1, 60, 60.1, 370/61, 58.1, 85.7, 77, 84, 68, 94.2, 108

[56] References Cited

U.S. PATENT DOCUMENTS

| | | | |
|---|---|---|---|
| 5,050,163 | 9/1991 | Van Bavel et al. | 370/94.1 |
| 5,179,556 | 1/1993 | Turner | 370/94.1 |
| 5,189,672 | 2/1993 | Le Bihan | 370/94.1 |

FOREIGN PATENT DOCUMENTS

2032301 12/1990 Canada.

OTHER PUBLICATIONS

Lixia Zhang, "VirtualClock: A New Traffic Control Algorithm for Packet Switching Networks," Sep., 1990, pp. 20-21, 23.

French Search Report.

*Primary Examiner*—Douglas W. Olms
*Assistant Examiner*—Huy D. Vu
*Attorney, Agent, or Firm*—Laff, Whitesel, Conte & Saret, Ltd.

[57] ABSTRACT

There is assigned to each virtual circuit a period (pm) corresponding to the theoretical minimum period between two consecutive cells of the virtual circuit and a maximum time limit (dm). The imaginary time of emission on the output multiplex of the last cell belonging to each virtual circuit is stored, and, upon the arrival of a new cell of a virtual circuit, a threshold time calculated by adding its actual time of arrival and the maximum time limit is compared with the imaginary time of emission expected of the new call in the course of being processed, the time being calculated by adding the imaginary time of emission of the last cell emitted and the minimum period (pm). If the result of this comparison shows that the threshold time is earlier than the imaginary time of emission expected (tde+pm), the incoming cell is not re-emitted, whilst, if it shows that the threshold time is later than the imaginary time of emission expected (tde+pm), it is emitted on the output multiplex, the imaginary time of emission of the incoming cell then being calculated, then stored in relation to the virtual circuit to which the incoming cell belongs.

11 Claims, 5 Drawing Sheets

3 Bits de poids fort

| tB\tA | 000 | 001 | 010 | 011 | 100 | 101 | 110 | 111 |
|---|---|---|---|---|---|---|---|---|
| 000 |  |  |  |  |  | 1 | 1 | 1 |
| 001 |  |  |  |  |  |  | 1 | 1 |
| 010 |  |  |  |  |  |  |  | 1 |
| 011 |  |  |  |  |  |  |  |  |
| 100 |  |  |  |  |  |  |  |  |
| 101 | 1 |  |  |  |  |  |  |  |
| 110 | 1 | 1 |  |  |  |  |  |  |
| 111 | 1 | 1 | 1 |  |  |  |  |  |

FIG. 4b

3 Bits de
poids fort

| t \ tde | 000 | 001 | 010 | 011 | 100 | 101 | 110 | 111 |
|---|---|---|---|---|---|---|---|---|
| 000 | | | | | | 1 | | |
| 001 | | | | | | | 1 | |
| 010 | | | | | | | | 1 |
| 011 | 1 | | | | | | | |
| 100 | | 1 | | | | | | |
| 101 | | | 1 | | | | | |
| 110 | | | | 1 | | | | |
| 111 | | | | | 1 | | | |

FIG. 5

METHOD FOR CONTROLLING THE DELIVERY FROM CELLS

The present invention relates to a method of controlling the flow of cells present on a virtual circuit of an asynchronous time multiplex, and to a circuit for implementing this method.

The routing of any flows and the sharing of the same transmission resources constitute the main benefit of asynchronous time switching. As a matter of fact, asynchronous time multiplexing makes it possible to transmit on one and the same carrier, that is to say on one and the same asynchronous time multiplex, cells belonging to different virtual circuits. However, the allocation of the resources generally relies on statistical calculations of the rates of activity of the different transmitting sources, with the result that there is a non-zero risk of losses of information as s result of overflow of the waiting queues due to instantaneous overloads. It is obviously necessary to minimize these losses.

A method of controlling the peak or average flow of the cells present on a virtual circuit is described in the Patent document FR-A-2 616 024 U.S. Pat. No. 4,896,316). It consists in providing for the elimination of those cells which belong to a communication and which are too many in relation to the admissible maximum threshold flow of the corresponding virtual circuit. This maximum flow is determined, for each virtual circuit, by the allocation of a predetermined clock frequency end of a predetermined threshold value. The measurement consists in calculating the difference between the number of incoming cells belonging to this virtual circuit and the number of pulses delivered by the clock. Elimination of the incoming cells is brought about so long as the difference calculated is not lower than the predetermined threshold value.

The choice between several values of threshold flow for different virtual circuits is made by the choice of several clock, which constitutes a disadvantage because of the lack of flexibility which that implies.

Moreover, if the clock selected for a specific virtual circuit passes through zero between the times of the arrivals of two consecutive cells of this circuit, the difference between the two corresponding values of the clock is no longer representative of a number of clock pulses. As a result the measurement of the flow is marred by an error. To solve this problem, generally the number of bits of the clock is overdimensioned, for example forty or fifty bits, so that the occurrence in question becomes rare, This method consequently requires considerable circuitry for its implementation.

The Patent document FR-A-2 616 025 (U.S. Pat. No. 4,993,024) is also known which describes s method of controlling the flow of cells on the virtual circuit of an asynchronous time multiplex. This method differs from the one described previously in that, when a cell arrives, the flow of the corresponding virtual circuit is compared with an average value allocated. When the allocated average value is found to be positive, the positive difference is translated into rights to be emitted which are proportional to the time which has elapsed since the previous request. These rights are accrued. When the allocated average value is found to be negative, it brings about the decrementing of the accrued number. If the accrued number is zero, there is a refusal of the authorisation to emit.

Even if this method does indeed solve the problem of the allocation of a predetermined flow for a given virtual circuit, it has the disadvantage of having a relatively slow response, so that it is essentially intended for controlling average flows and it is not at all suitable for controlling peak flows.

The Patent document FR-A-2 657 482 (corresponding to U.S. Pat. No. 5,297,140) is also known which relates, this time, essentially to a method of smoothing and controlling the flows of asynchronous time communications by managing, in particular, the duration between two consecutive cells of a virtual circuit. This method consists in determining the actual time of re-emission as a function of a theoretical minimum period of time separating two consecutive cells of one and the same virtual circuit, and in stowing the incoming cell in a memory at the address formed from this re-emission time. The flow control is effected by comparing the number of waiting cells to a predetermined maximum number for the corresponding virtual circuit. Any cell too many is destroyed.

This device does not have any major disadvantages, except that of grouping together the functions of controlling the flows of the cells and those of managing the space of time separating two consecutive cells belonging to one and the same virtual circuit when these are too close together.

For essentially reasons of flexibility of installation of the systems, it is preferable to decouple these functions and to make provision for them, the one or the other, at different locations in the network.

Consequently, an aim of the invention is to provide a method of flow control which does not necessarily effect the management of the space of time between cells and which does not have the disadvantages of the control methods which have been mentioned above.

To this end, a method of flow control according to the invention is characterised in that there is assigned to each virtual circuit a period corresponding to the theoretical minimum period between two consecutive cells of the said virtual circuit and a maximum time limit, the imaginary time of emission on the output multiplex of the last cell belonging to each virtual circuit is stored, and, upon the arrival of a new cell of a virtual circuit, a threshold time calculated by adding its actual time of arrival and the said time limit is compared with the imaginary time of emission expected of the said new cell, the said imaginary time being calculated by adding the said imaginary time of emission of the last cell emitted and the said minimum period, and, if the result of this comparison shows that the said threshold time is earlier than the said imaginary time of emission expected, the said incoming cell is not re-emitted on the output multiplex, whilst, if it shows that the said threshold time is later khan the imaginary time of emission expected, it is emitted on the output multiplex, the imaginary time of emission of the said incoming call then being calculated, then stored in relation to the virtual circuit to which the said incoming cell belongs.

According to another characteristic of the invention, the imaginary time of emission of the incoming cell which is calculated is the actual time of arrival if the said time of arrival is later than the said imaginary time of emission expected.

According to another feature of the invention, the imaginary time of emission of the incoming cell which is calculated is either the imaginary time of emission of the previous cell if the said threshold time is earlier then the said imaginary time of emission expected, or the said imaginary time of emission if the threshold time is later than the said imaginary time of emission.

According to another feature of the invention, there is assigned to each virtual circuit a bit the value of which at one when the imaginary time of emission stored for the said virtual circuit is earlier by a predetermined duration of time then the actual time, end et zero in the contrary case.

The present invention also relates to a circuit for controlling the flow of cells of a virtual circuit intended for the implementation of a method such as the one which has just been described.

According to one feature, the said circuit comprises an input multiplex and an output multiplex and it is characterised in that it comprises, moreover, a memory comprising one storage zone for each virtual circuit, each zone being divided into sections in which there are respectively stored the imaginary time of emission of the last cell emitted, the minimum period and the maximum duration of delay of the corresponding virtual circuit, the said memory being addressed, upon the arrival of en incoming cell on the input multiplex, by the number of the virtual circuit to which the said incoming cell belongs, a gets the input of which is connected to the input multiplex end the output of which is connected to the output multiplex, a calculating unit comprising inputs respectively connected to the read outputs of the memory in order to read there each section of the zone addressed, a first output connected to a control input of the gate in order to sanction or not the emission on the output multiplex of the cell present on the input multiplex, end a second output connected to a write input of the memory in order to store in the section of the zone addressed the imaginary time of emission of the incoming cell calculated by the said calculating unit, a clock the output of which is connected to the corresponding input of the calculating unit, the said unit delivering, as a function of the local time delivered by the said clock, of the imaginary time of emission, of the minimum period and of the maximum duration respectively stored in the corresponding sections of the memory zone which is addressed by the incoming cell, a signal et the control input of the gate in order to order or not the emission on the output multiplex of the said cell and calculating the imaginary time of emission of the said incoming cell in order to store it in the corresponding section of the zone addressed by the said cell.

According to another feature of the invention, the said calculating unit comprises an adder, a first input end a second input of which receive respectively the signal of the imaginary time of emission of the last cell emitted and the minimum period signal delivered by the memory addressed by the virtual circuit number of the incoming cell, the output of the said adder being connected to a first input of a comparator, the second input of which receives the threshold time signal of the incoming cell, the output of the comparator being connected, on the one hand, to the terminal of the calculating unit which is itself connected to the control input of the gate and, on the other hand, to the control input of a multiplexer, the inputs of which receive respectively the signal of the imaginary time of emission of the last cell emitted delivered by the memory and the signal delivered by the said adder, the output of the said multiplexer being connected to the terminal of the calculating unit, itself connected to the write input of the memory for the storage of the imaginary time of emission of the incoming cell.

According to another feature of the invention, in order to calculate the threshold time of arrival of the incoming cell, the calculating unit comprises, moreover, a second adder, the two inputs of which receive respectively the local time signal delivered by the clock and the maximum time limit signal delivered by the memory, the output of the said adder delivering the said threshold time signal.

According to another feature of the invention, the said calculating unit comprises, moreover, a second comparator, a first input of which is connected to the output of the first adder and the second input of which is connected to the clock in order to receive there the local time signal, the output of the said comparator being connected to the control input of a second multiplexer, the two inputs of which are respectively connected to the output of the first multiplexer and to the output of the clock in order to receive there the local time signal, the output of the said multiplexer then forming the output of the calculating unit.

According to another feature of the invention, each comparator has its inputs which are respectively connected to the outputs of an analysis circuit, the corresponding inputs of which receive the signals that are to be compared, the said circuit inverting the most significant bit of each of the signals present at its input when a single one of the said signals has passed through zero and the other is at a predetermined distance from the first one.

According to another feature of the invention, the calculating unit comprises, moreover, an input for receiving there an activation signal delivered by a processor at those times when it is itself addressing the said memory and an output at which it delivers a bit the value of which is at one when the imaginary time of emission of the last cell emitted stored is earlier by a predetermined duration of time than the actual time and at zero in the contrary case, the said output being connected to a storage input of the memory in order to be able to store the said bit in a section of the zone addressed, the memory having a read output in order to be able to deliver, upon the arrival of a cell, the said bit stored in the section of the zone addressed by the said cell and in order to supply it to a corresponding input of the calculating unit, the said calculating unit delivering, as imaginary time of emission of the said incoming cell, the said imaginary time normally calculated if the bit stored in the zone addressed by the incoming cell is at zero, and the local time if it is at one.

According to another feature of the invention, the said bit is supplied to one input of an OR gate, the second input of which is connected to the output of the second comparator, the output of the said gate being connected to the control input of the second multiplexer.

The features of the invention mentioned above, as well as others, will become more clearly apparent on reading the following description of en exemplified embodiment, the said description being given in relation to the accompanying drawings, in which:

Figure 1:
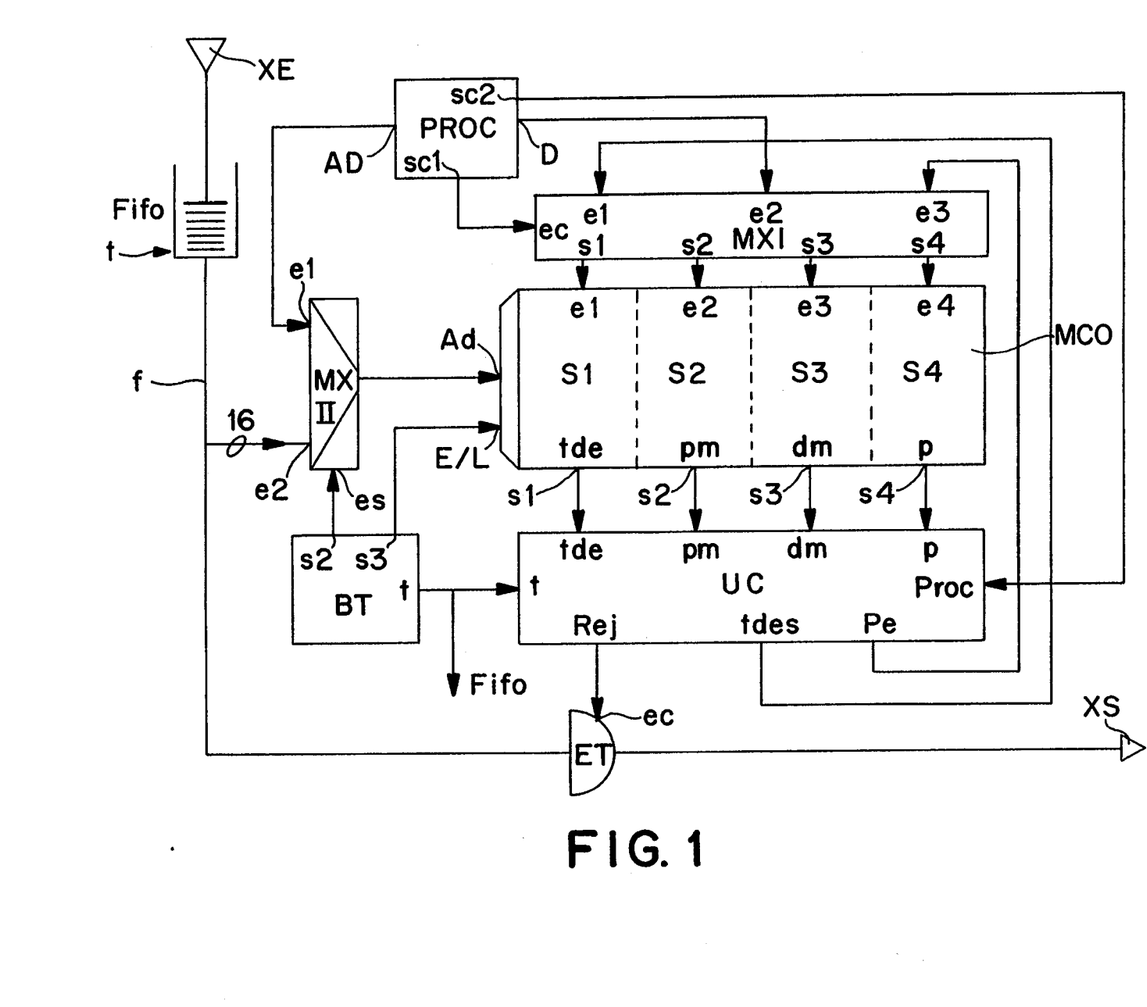
FIG. 1 is a synoptic diagram of a flow control circuit according to the present invention.

The flow control device shown in FIG. 1 comprises essentially an input queue Fifo, a memory MCO called a context memory, a calculating unit UC, a time bests BT and a multiplexer MXI.

The queue Fifo receives et its input en incoming multiplex XE which is, for example, an asynchronous time multiplex of the type of the one which is described in the Patent document EP-A-108 208 (U.S. Pat. No. 4,594,708). Each cell delivered at the output of the queue Fifo, celled hereinafter incoming cell, is presented on a bunch of wires f, a certain number of which, for example sixteen, carry the representative bits of the number of the virtual circuit of the incoming cell. The bunch of wires f at the output of the queue Fifo is connected to an AND gate having a number of inputs which corresponds to the number of wires of the bunch f. The output of the AND gate is connected to an outgoing multiplex XS. It also comprises a control input ec, of the inverter type, connected, as will be seen subsequently, to an output Rej of the calculating unit UC.

When the AND gate receives a level one at its input ec, its outputs ere at a level zero, while, when it receives a level zero, its inputs are recopied at its outputs. It will be said, subsequently, that the incoming cell is, in this latter case, emitted on the output multiplex XS.

The memory MCO is a dynamic random access memory comprising as many addressable zones as there are virtual circuits which the system can process.

Each zone of the memory MCO is divided into four sections $S_1$ to $S_4$ respectively intended to store, for each zone and therefore for each virtual circuit number:

the imaginary time of emission of the last cell which has arrived tde, a theoretical period of time pm corresponding to the minimum period which has to separate two cells of the virtual circuit on the multiplex XS in order for the flow of cells of the virtual circuit in question to be always less than the predetermined flow of this circuit, a maximum time limit dm corresponding to the maximum delay time which a cell of a virtual circuit can, in normal operation, take in the network, and a so-called peremption bit P, the function of which is explained below.

The duration dm corresponds to the maximum authorised delay time which a cell of a virtual circuit can take in the network. The time limit dm can very well be much less than the period pm. As a matter of fact, for a word cell, the period pm is, for example, about six milliseconds, while the delay time of certain networks of the asynchronous time type is of the order of several hundred microseconds. The maximum time limit dm is evaluated in relation to the arrival in the control device of the fastest cell in the network. This maximum time limit dm can vary as a function of possible priorities between the cells belonging to different virtual circuits.

It should be noted that, if one considers an identical time limit dm for all the virtual circuits, this value can be supplied directly to the calculating unit UC end the corresponding section $S_3$ of the memory MCO does not exist.

The imaginary time of emission tde is advantageously coded in three fields respectively of 8 bits, 16 bits and 8 bits. The first corresponds to the insignificant bits and can be considered as the "decimal" portion. The second is of a dimension such that it is possible to code there the maximum value beyond which a cell is not re-emitted, whatever the virtual circuit number may be. The third can be considered as the significant bits. It makes it possible to identify the long-term events and to code the periods of value greater than the maximum delay which a cell can take in the network.

The period pm is, for its part, coded over 30 bits, 22 significant bits thereof serving to express the minimum period between two cells to be emitted and 8 insignificant bits thereof serving to refine the mean time distance between the emission of two consecutive cells.

The time limit dm is, for its part, coded over 24 bits like the times, but without the decimal field of 8 bits.

The memory MCO comprises an addressing input Ad for selecting a zone and a write/read mode selection input E/L.

The addressing input Ad is connected to the output of a multiplex MXII having two inputs, the one $e_1$ of which is connected to the addressing bus AD of a processor PROC and the other $e_2$ of which connected to the wires of the bunch f which carry the serial number of the circuit of true incoming cell.

The memory MCO comprises, moreover, four inputs $e_1$ to $e_4$ at which there are applied the signals tde, pm, dm and P for their recordings, in write made, in the corresponding sections of the zone addressed.

It comprises, moreover, four outputs $s_1$ to $s_4$ at which it delivers, in read mode, the signals tde, pm, dm and P coming from the corresponding sections $S_1$ to $S_4$ of the zone address of which is present on Ad.

The clock BT comprises a first output t by which it supplies, to the calculating unit UC and to the queue Fifo, a signal t representing the local actual time.

The queue Fifo delivers the cells at its output in synchronism with the signal t.

The signal t is coded over twentyfour bits and does not comprise decimal bits.

The clock BT comprises a second output $s_2$ connected to the selection input es of input of the multiplexer MXII and a third output $s_3$ connected to the control input E/L of the memory MCO.

Each elementary time t is divided into four parts, designated hereinafter $t_1$ $t_2$, $t_3$ and $t_4$. During the times t1 and t2, the second output $s_2$ of the clock BT is at a level such that the multiplexer MXII has its output which carries the number of the virtual circuit which is present et its input $e_2$, whilst, during the times $t_3$ and $t_4$, it is at a level such that it has its output which carries the address which is supplied to it at its input $e_1$ by the processor PROC.

During the times $t_1$ and $t_3$, the clock BT has its third output $s_3$ which delivers, to the memory MCO, a control signal of the read mode, while, during the times $t_2$ and $t_4$, it delivers to it a control signal of the write mode, the latter mode is active only if an incoming cell is present or if the processor is addressing the memory.

The calculating unit UC possesses four inputs tde, pm, dm, P, having the same references as the signals which they carry, respectively connected to the four outputs $s_1$ to $s_4$ of the memory MCO at which there are respectively present, when the memory MCO is addressed in read mode, the values tde, pm, dm and P of the zone addressed. The calculating unit UC also possesses an output tdes at which it delivers a signal tdes representing the imaginary time of emission of the cell processed and an output Rej at which it delivers a control signal Raj for rejection or not of the cell processed, The outputs Rej and tdes are respectively connected to the control input ec of the AND gate, as has already been described, and to an input $e_1$ of the multiplexer MXI. It possesses, moreover, an output Pe at which it delivers a so-called peremption bit P, the function of which is described below, The output Pe is connected to a corresponding input $e_3$ of the multiplexer MXI. The calculating unit UC is described in more detail below in relation to FIG. 2.

The multiplexer MXI possesses four outputs $s_1$ to $s_4$ respectively connected to the inputs $e_1$ to $e_4$ of the memory MCO. This latter being addressed in write mode, the signals at the outputs $s_1$ to $s_4$ of the multiplexer MXI are recorded, in the corresponding sections of the zone addressed.

The multiplexer MXI possesses, moreover, a third input $e_2$ which is connected to a bus D of the processor PROC in order to be able to initialize the values of pm and of dm of each virtual circuit, and a control input ec which is connected to a control output $sc_1$ of the processor PROC.

The operation of the control device shown in FIG. 1 is as follows.

When it is switched on, or upon the establishment or upon the breaking-off of communications, the processor PROC accesses, via the multiplexer MXI, the zones of the memory MCO in order to initialize each section of the zones addressed, in particular $S_2$, $S_3$ and $S_4$. In order to do this, it places, during the time $t_4$ of the clock BT, at the input of the multiplexer MXII, the address of the zone of the memory MCO to be initialized. It supplies a selection signal at the control input ec of the multiplexer and, through the intermediary of this latter and via its bus D, it supplies to the inputs $e_1$ to $e_4$ of the memory MCO, and for each zone of the memory MCO addressed and for the section $S_1$ to $S_4$ selected, the initialization values of tde, pm, dm and P of the corresponding virtual circuits. The peremption bits P of all the virtual circuits are, at the start, as will be seen subsequently, positioned at zero. It will also be understood that the initialization of the section $S_1$, containing tde, is not necessary within the framework of the present invention.

In normal operation, when a cell arrives, at the local time t given by the clock BT, the number of the virtual circuit of this cell is supplied, at the times $t_1$ and $t_2$ of the clock BT and via the multiplexer MXII, to the addressing input Ad of the memory MCO.

At the time $t_1$, the values tde, pm, dm, and P corresponding to this virtual circuit ere delivered to the calculating unit UC. On the basis of these signals, the calculating unit UC, according to e method described below, decides on the rejection or not of the incoming cell by delivering the corresponding signal Rej and calculates the imaginary time of emission of this cell tdes.

When rejection occurs, the output Rej of the calculating unit UC passes to a level 1, with the result that the output levels of the AND gate are zero. Each bit of the cell is therefore not recopied on the output multiplex XS, and it will be said that the cell is not emitted.

On the other hand, when rejection does not occur, the output Rej of the calculating unit UC is at a level zero, with the result that the incoming cell is recopied on the outgoing multiplex XS; it is said to be emitted.

At the time $t_2$, the same zone of the memory MCO is addressed. The memory MCO is in write mode and receives, via the multiplexer MXI, the signal tdes which the calculating unit UC has just calculated. This value is recorded in the corresponding section $S_1$ of the zone addressed.

During the times $t_3$ and $t_4$, the processor PROC processes the peremption but P. This operation is described hereinafter.

Figure 2:
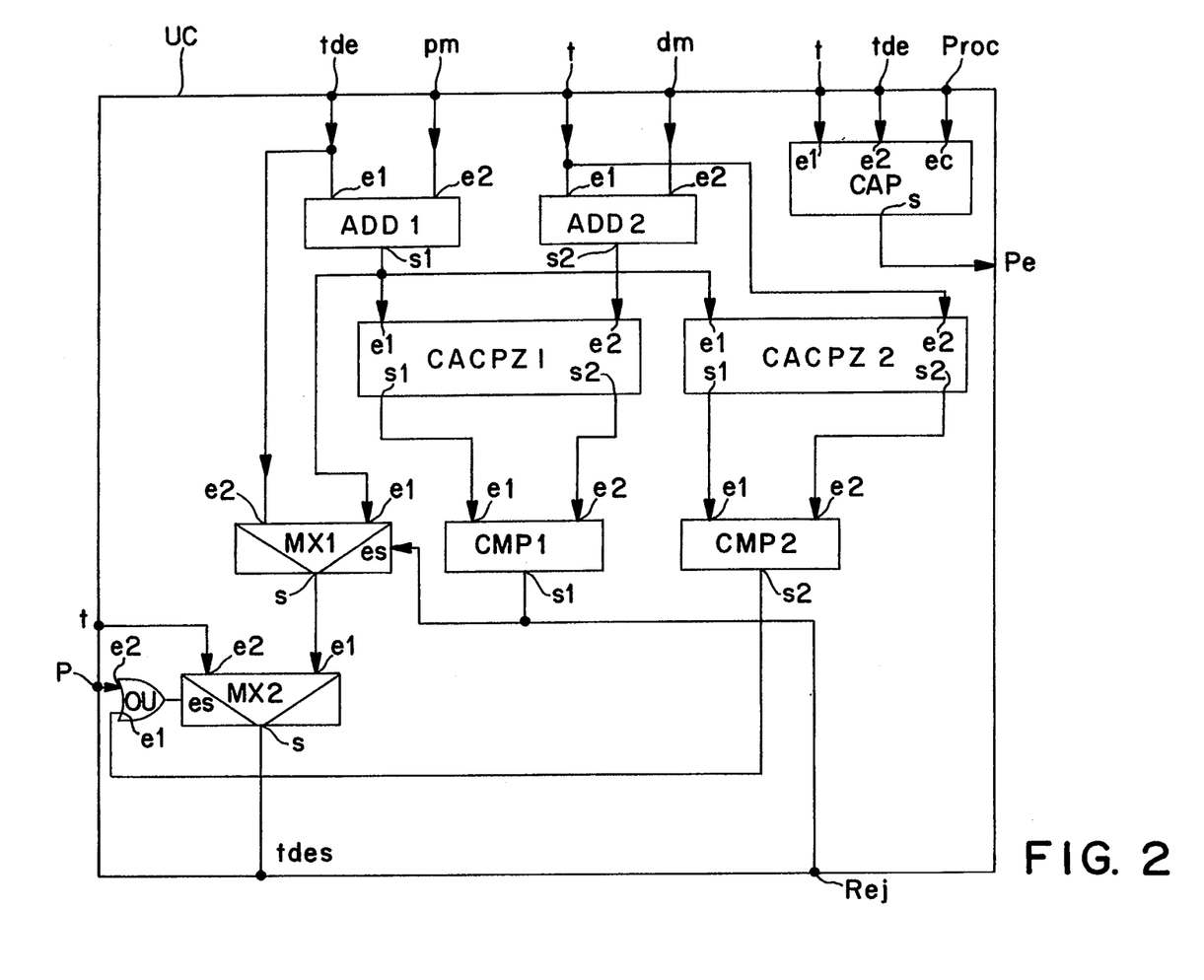
FIG. 2 is a synoptic diagram of the calculating unit of a control circuit according to the present invention.

For the moment, the calculating unit UC will be described in relation to FIG. 2, which give a synoptic diagram thereof.

It comprises e first adder ADD1 having two inputs $e_1$ and $e_2$ respectively connected to the input tde and the input pm of the unit UC, themselves respectively connected to the outputs $s_1$ and $s_2$ of the memory MCO.

It also comprises a second adder ADD2 having two inputs $e_1$ and $e_2$ respectively connected to the input t and to the input dm of the unit UC, themselves respectively connected to the output t of the clock BT and to the output $s_3$ of the memory MCO.

The output $s_1$ of the first adder ADD1 and the output $s_2$ of the second adder ADD2 are respectively connected to the inputs $e_1$ and $e_2$ of a first zero-passage analysis and correction circuit CACPZ1, of which the two outputs $s_1$ and $s_2$ corresponding to these two inputs $e_1$ and $e_2$ are respectively connected to the inputs $e_1$ and $e_2$ of a first comparator CMP1. The output $s_1$ of this latter is connected to the output Rej of the calculating unit UC.

The output $s_1$ of the first adder ADD1 is connected to the input $e_1$ of a second zero-passage analysis and correction circuit CACPZ2, the other input $e_2$ of which is connected to the input t of the unit UC. The outputs $s_1$ and $s_2$ corresponding to the inputs $e_1$ and $e_2$ of the circuit CACPZ2 are respectively connected to the two inputs $e_1$ and $e_2$ of a comparator CMP2, the output $s_2$ of which is connected to a first input of an OR gate. The second input $e_2$ is connected to the input P of the calculating unit UC, which input is connected to the output $s_4$ of the memory MCO.

The structure and operation of the circuits CACPZ1 and CACPZ2 are described hereinafter. For the moment, it will be possible to remember that the signal at an input $e_1$ is normally to be found at the corresponding output and that they make it possible to solve the problems which are bound up with the passage through zero of one of the signals present at their inputs $e_1$ or $e_2$.

The comparator CMP1 is such that it delivers at its output $s_1$ a bit at zero when the value of the signal at its input $e_1$ is less than that at the second input $e_2$, and a bit at one when the value at the first input $e_1$ is greater than that at the second input $e_2$.

As regards the comparator CMP2, it delivers a bit at zero when the value of the signal at its input $e_1$ is greater than that at the second input $e_2$, end a bit at one when the value at the first input $e_1$ is lower than that at the second input $e_2$.

The output $s_1$ of the first adder ADD1 is, moreover, connected to a first input $e_1$ of a multiplexer MX1 comprising a second input $e_2$ connected to the input tde of the unit UC. The output $s_1$ of the comparator CMP1 is, moreover, connected to the selection input es of the multiplexer MX1. The output s of the multiplexer MX1 is connected to the input $e_1$ of a second multiplexer MX2, the other input $e_2$ of which receives the clock signal t coming from the clock BT. This second multiplexer MX2 has its selection input es which is piloted by the output of the OR gate.

The output s of the multiplexer MX2 is connected to the output tdes of the calculating unit UC, at which there is present the signal of same name representing the imaginary time of emission of the cell in the course of being processed.

The operation of the calculating unit UC is as follows.

The first adder ADD1 calculates a imaginary time of emission of the incoming cell, which time corresponds to the imaginary time of emission tde of the last cell emitted added to the minimum period pm. As regards the adder ADD2, it calculates a time which corresponds to the local time of arrival of the incoming cell t added to the maximum time limit dm. This time is called the threshold time, since a cell which would have an imaginary time of emission later than this time would not be re-emitted.

It will be considered, at first, that the times calculated by the two adders ADD1 and ADD2 are expressed in figures having one end the same order of magnitude. The circuit CACPZ1 then delivers respectively at its outputs $s_1$ and $s_2$ the signals present at its inputs $e_1$ and $e_2$.

Be will not concern ourselves either for the moment with the processing of the peremptions. The bit P is considered as being at zero, and the multiplexer MX2 then delivers at its output s and supplies, consequently, to the output tdes of the calculating unit UC, the signal which is present at its input $e_1$, that is to say the signal which is at the output s of the multiplexer MX1.

Let us consider first of all the case of a cell C1 (FIG. 3) arriving at a time $t_1$ and the imaginary time of emission of which should be $td2_o+pm$ greater than its threshold time $t_1+dm$. The comparator CMP1 delivers at its output $s_1$ a level one which is supplied on the one hand, to the control input ec of the AND gate, which then delivers a signal of value zero on the output multiplex XS (see FIG. 1) and, on the other hand, to the selection input es of the multiplexer MX1, which then delivers at its output s of the time tde. The cell in the course of being processed is therefore not re-emitted and its imaginary time of emission tdes is in reality equal to that of the last preceding cell tde, ($tde_o=tde_1$).

Figure 3:
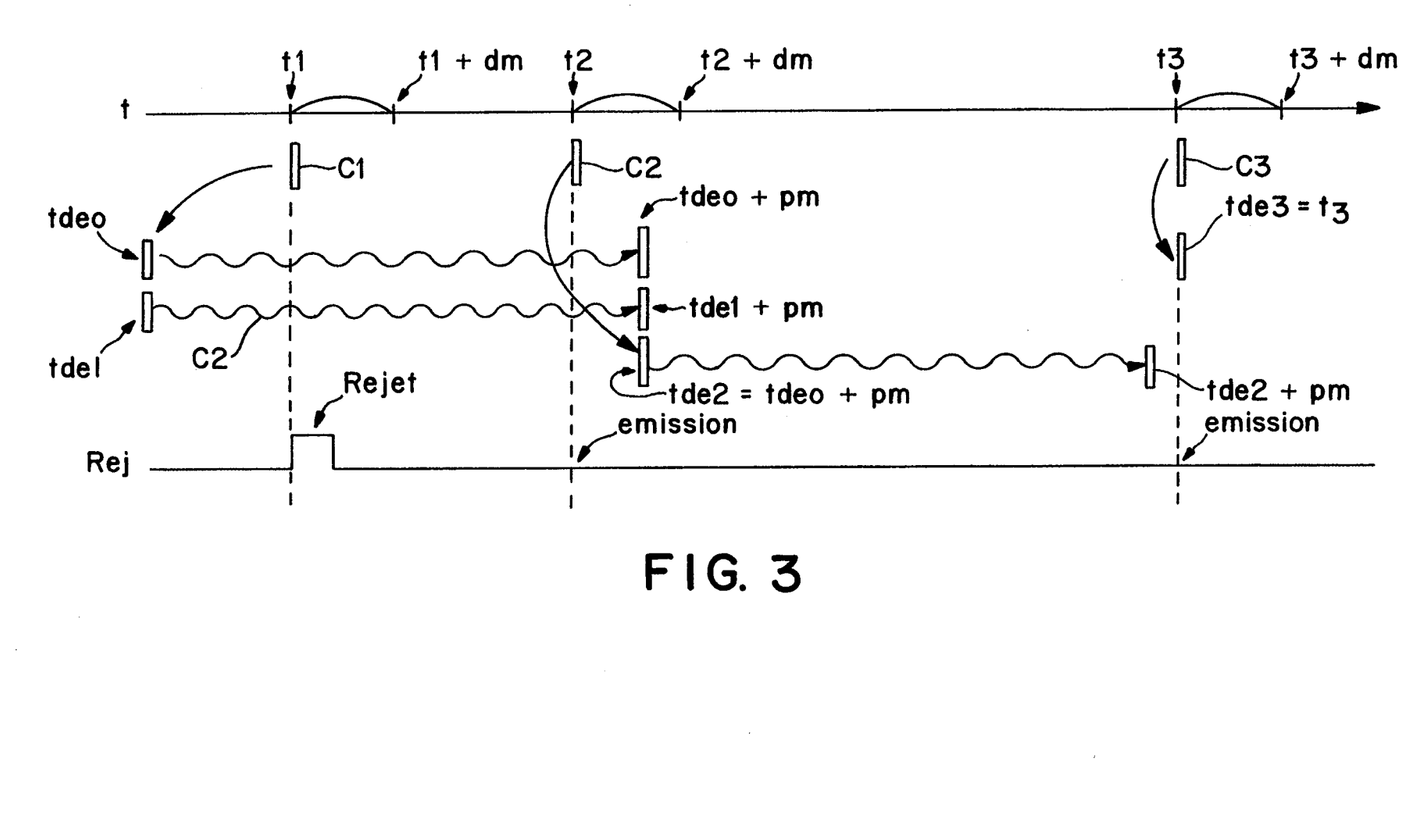
FIG. 3 is a diagram showing the result of the control method according to the invention and the operation of a control circuit according to the invention.

Thus, in the event of rejection of the incoming cell, the imaginary time of emission is unchanged and remains tde. Everything happens, viewed from the output multiplex XS, as if this incoming cell had not existed.

Let us now consider the case of a cell C2 arriving at a time $t_2$ end the imaginary time of emission of which should be $tde+pm$ lower than its threshold time $t+dm$. The comparator CMP1 delivers at its output $s_1$ a level zero which is supplied to the control input $e_c$ of the AND gate, this latter then delivers on the output multiplex XS the incoming cell (FIG. 1). The incoming cell is therefore re-emitted. It is also supplied to the selection input es of the multiplexer MX1, which then delivers at its output s the time tde+pm, which via the multiplexer MX2 is to be found at the output tdes of the calculating unit UC. The imaginary time of emission of the cell C2 in the course of being processed and of which there has just been ordered the emission at the time t, is now tde+pm. ($tde_2+tde_1+pm$)

Let us suppose that a cell C3 arrives at a time $t_3$ which is later than its imaginary time of emission expected tde+pm.

The comparator CMP2 then compares the threshold time tde+pm delivered by the adder ADD1 end the time t present at the input t of the calculating unit UC end delivers a level one which is supplied to the multiplexer MX2, via the OR gate. The multiplexer MX2 delivers at its output s, no longer the time tde or tde+pm present at the output s of the multiplexer MX1 as previously, but the time t present at its input $e_2$. The cell C3 is then emitted and its imaginary time of emission is t ($tde_3=t$).

It will be noted that, when the time tde+pm is greater than t, the comparator CMP2 delivers e level zero which, if the bit P at the input P of the unit UC is at zero, is to be found at the control input es of the multiplexer MX2. This latter then delivers tde or tde+pm.

Figure 4A:
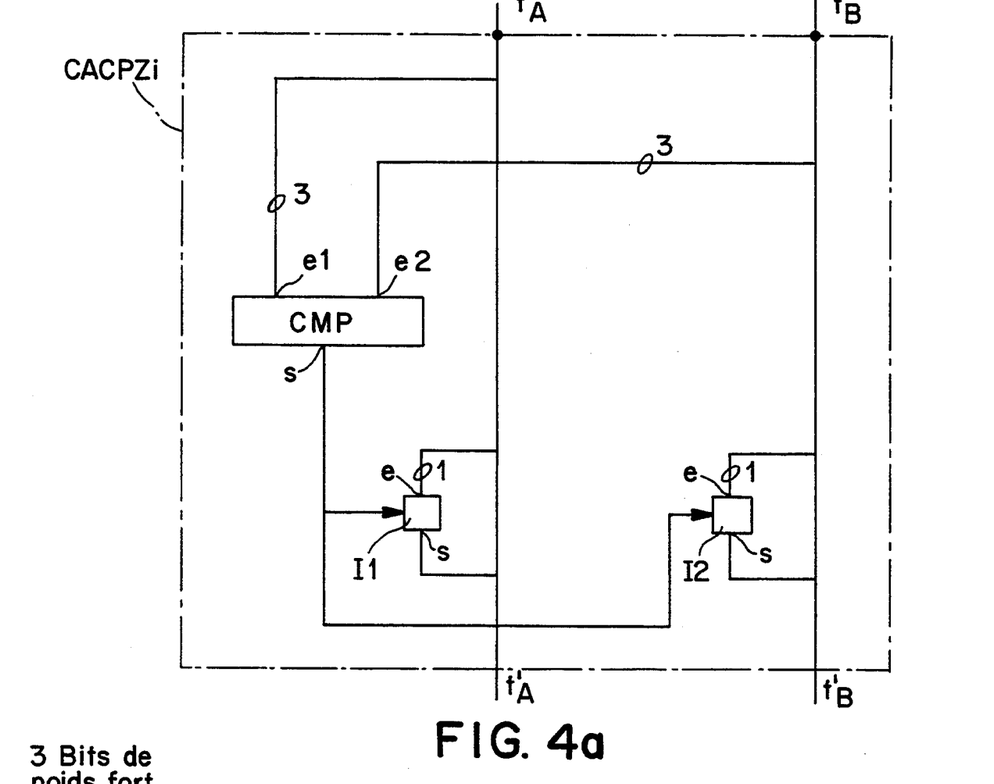
FIG. 4a is a synoptic diagram of an analysis circuit with which a calculating unit of a control circuit according to the invention is equipped.

The operation of the zero-passage analysis end correction circuit will now be described.

Reference will be made to FIG. 4a which shows a synoptic diagram of such a circuit. It comprises e comparator CMP the inputs $e_1$ and $e_2$ of which are respectively connected to the wires which carry the most significant bits, on the one hand, of the time $t_A$ and, on the other hand, of the time $t_B$. The three significant bits can, for example, be used.

For the circuit CACPZ1, $t_A$ end $t_B$ are respectively the times tde+pm and t+dm respectively delivered by the adders ADD1 and ADD2. For the circuit CACPZ2, $t_A$ end $t_B$ are respectively the time tde+pm delivered by the adder ADD1 and the local time t.

Figure 4B:
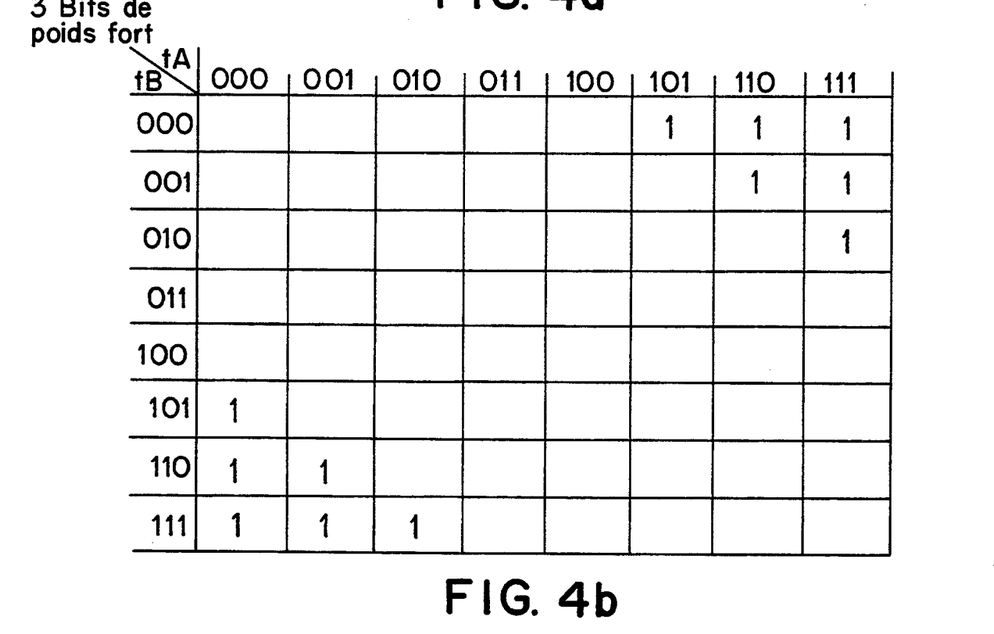
FIG. 4b is a truth table of a comparison circuit with which an analysis circuit according to FIG. 4a is equipped, end

The comparator CMP operates in accordance with the truth table shown in FIG. 4b. It can be noted that it delivers a level one when the distance which separates the two times $t_A$ and $t_B$ around the time of value zero is et the most three octants (space of time of a dimension equal to one-eighth of the largest value which each time $t_A$, $t_B$) can assume. In the other cases, it delivers a zero.

The analysis circuit $CACPZ_1$ shown comprises, moreover, two controlled inverters $I_1$ and $I_2$, the inputs e of which are respectively connected to the wires which carry the most significant bit of of the times $t_A$ end $t_B$. The outputs s of the inverters $I_1$ end $I_2$ are respectively connected to the wires which carry the most significant bit of the times $t'_A$ and $t'_B$, which times are delivered in output of the analysis circuit.

When the comparator CMP has its output s at a level one, the inverters $I_1$ and $I_2$ invert respectively the significant bits of the times $t_A$ and $t_B$, whilst, when it has its output at a level zero, they do not invert these bits.

By way of example, let us suppose:

$t_A$=000xxxxxxxxx and $t_B$=110xxxxxxxxx in which x represents a bit the value of which can be any whatever.

In accordance with the truth table of FIG. 4a, the comparator delivers at the control inputs of the inverters a level 1. The new times ere then:

$t'_A$=100xxxxxxxxx and $t'_B$=010xxxxxxxxx.

It can be noted on this example that the analysis circuit described makes it possible to have two signals $t'_A$ and $t'_B$ available which are no longer around zero and to sanction their comparison without error.

Be will now describe the analysis of the peremption made by the calculating unit UC and leading to the emission of a peremption bit P, the function of which will also be described.

For the analysis of the peremption, the calculating unit UC comprises (FIG. 2) a peremption analysis circuit CAP which possesses two inputs $e_1$ and $e_2$ which receive respectively the local time t coming from the clock BT and the imaginary time of emission tde recorded in the zone of the memory MCO which is addressed by the processor PRDC at the time $t_3$ of the time basis BT. The circuit CAP comprises, moreover, a control input ec connected to a control input proc of the calculating unit UC at which the processor PROC places a control bit, the function of which is explained hereinafter. It possesses an output s connected to the output Pe of the calculating unit UC.

Figure 5:
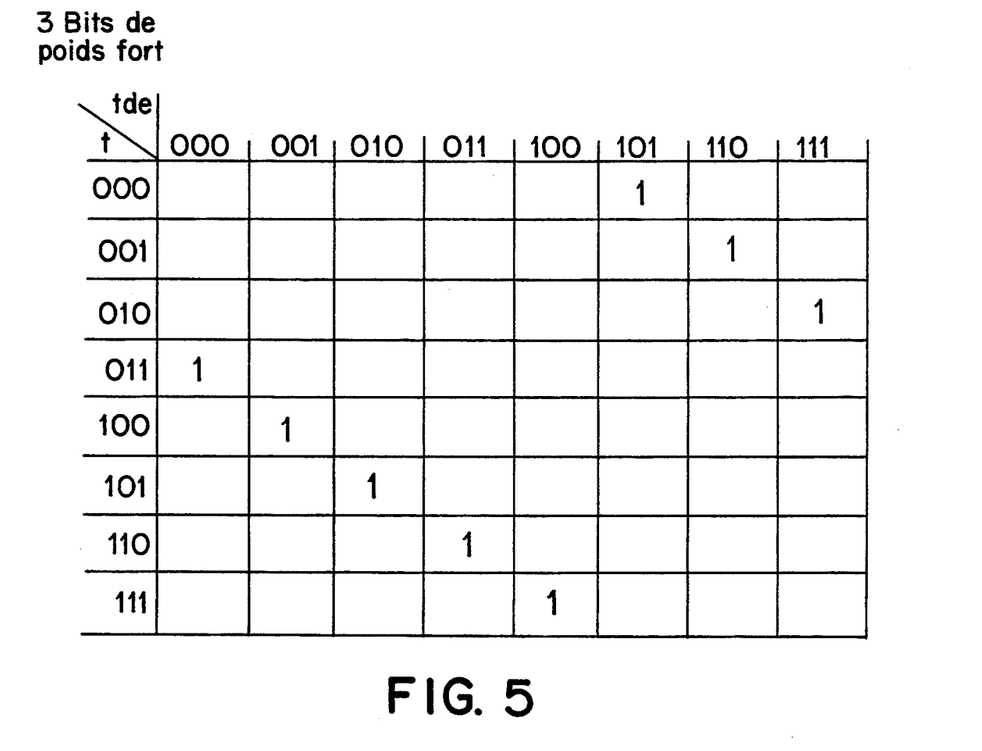
FIG. 5 is an operating truth table of the peremption analysis circuit with which a control circuit according to the invention is equipped.

The circuit CAP functions in accordance with the truth table of FIG. 5. It will be noted that, in FIG. 5, if the three most significant bits of the signal t of the local clock are distant, modulo $2^3$, by $2^2-1$ from the time tde, the analysis circuit delivers a bit of value equal to 1, and, in the contrary case, a bit at 0.

It can be noted that the bit P is at one when the times t and tde are no longer comparable, that is to say when the time tde for the virtual circuit in question is too much earlier than the local time t. It is at zero in the contrary case.

It will be recalled that the processor PROC addresses the memory MCO, via the multiplexer MXI, during the times $t_3$ and $t_4$ of the clock BT. During the time $t_3$, the memory MCO is controlled in read mode and, during the time $t_4$, the memory MCO is in write mode.

During the times $t_3$ and $t_4$, the processor PROC has two essential functions to ensure; on the one hand, it carries out operations, in particular updating of the values pm and dm in the case of modifications of these latter for a given virtual circuit, and, on the other hand, it processes the peremption bit P.

In the first case, it addresses the memory MCO with the virtual circuit number the values pm and dm of which are to be modified and, in the second case, with a signal which is incremented at each updating of the peremption bit. In order to differentiate different modes of operation, a bit, proc, positioned by the processor PROC itself at zero in the first case and at one in the second case, is supplied to the peremption analysis circuit CAP, with the result that this latter is active only in those cases where the processor PROC addresses the memory MCO with e view to the processing of the peremption.

All the addresses of the memory MCO are to be explored in less than an octant of the clock BT.

The peremption bit P calculated by the analysis circuit CAP from the values of t and tde of the zone of the memory MCO addressed by the processor PROC is then recorded in the section $S_4$ of the same zone.

For the processing of an incoming cell, the function of the peremption bit is as follows. The bit P which is recorded in the zone of the memory MCO which is addressed, during the time $t_1$, by an incoming cell is supplied to the calculating unit UC. In this latter, this bit is supplied, via the OR Gate, to the control input es of the multiplexer MX2 (FIG. 2). If it is at one, that is to say in those cases where the threshold time tde+pm cannot be compared to t, the time t the signal of which is to be found in output s of the multiplexer MX2 is then considered as the imaginary time of emission of the last cell emitted for the virtual circuit in question. If it is at zero, (normal cases), this imaginary time of emission in output of the multiplexer MX2 is the one which is calculated normally by the calculating unit UC.

Finally, when a cell has been processed in the time $t_1$, at the time $t_2$ the peremption bit P of the virtual circuit of the cell which has just been emitted or rejected is repositioned at zero.

Likewise, upon the start-up of the system, the peremption bits of all the virtual circuits are positioned at zero in the memory MCO.

We claim:

1. A method of controlling an inflow of data cells which are present on a virtual circuit of an asynchronous input time multiplex in order to control an outflow of data cells of said virtual circuit on an output multiplex, said method comprising the steps of assigning to each virtual circuit a period (pm) corresponding to a theoretical minimum period between two consecutive data cells of said virtual circuit and a maximum time limit (dm), storing an imaginary time of emission over an output multiplex of the last data cell belonging to each virtual circuit, calculating a threshold time responsive to an arrival of a new incoming data cell of a virtual circuit, said threshold time being calculated by adding an actual time of new data cell arrival and said maximum time limit, comparing the calculated threshold time with an expected imaginary time of emission that is for re-emission of said new data cell which is being processed, calculating said imaginary time of emission by adding the time when last data cell was emitted and said minimum period (pm), preventing a re-emission of said incoming data cell responsive to said comparison showing that said threshold time occurs earlier than the said imaginary time of emission (tde+pm), emitting said incoming data cell on an output multiplex responsive to said comparison showing that said calculated threshold time occurs later than the calculated imaginary time of emission (tde+pm), and, calculating and storing the imaginary time of said emission of said incoming data cell in relation to the virtual circuit to which said incoming data cell belongs.

2. A method according to claim 1 wherein said calculated imaginary time of emission of the incoming data cell is the actual time of arrival (t) if the said time of arrival is later than the expected imaginary time of emission (tde+pm).

3. A method according to claim 1 wherein the calculated imaginary time of emission of the incoming data cell is either the imaginary time of emission of the previous data cell (tde) if said threshold time (t+dm) is earlier than the expected imaginary time of emission (tde+pm), or the expected imaginary time of emission (tde+pm) if the threshold time (t+dm) is later than said imaginary time of emission (tde+pm).

4. A method according to either claim 1 or claim 2 wherein each virtual circuit has an assigned bit P with a value of one when the imaginary time of emission (tde) stored for said virtual circuit is earlier by a predetermined period of time which is earlier than the actual time (t), and with a value of zero in any other case.

5. A circuit for controlling an inflow of data cells of a virtual circuit of an asynchronous input time multiplex in order to control an outflow of data cells of said virtual circuit on an output multiplex, said circuit comprising an input multiplex means (XE), and an output multiplex means (XS), a memory means (MCO) coupled to receive signals from said input multiplex means (XE), said memory means (MCO) comprising one storage zone for each virtual circuit, each zone being divided into sections S1, S2 and S3 in which there are respectively stored an imaginary time of emission (tde) of a last data cell that was emitted, a minimum time period (pm), and a maximum duration of a delay (dm) of a corresponding virtual circuit, said memory means (MCO) being addressed in response to an arrival of an incoming data cell on a input multiplex means, said address being a number identifying the virtual circuit to which said incoming data cell belongs, a AND gate (ET) having an input which is connected to the input multiplex means (XE) and an output which is connected to the output multiplex means (XS), calculating unit means (UC) having a plurality of inputs respectively connected to a plurality of read outputs of the memory means (MCO) in order to read there each section (S1, S2 and S3) of an addressed zone, said calculating unit means (UC) having a first output (Rej) connected to a control input of the AND gate (ET) in order to authorize or not authorize the emission on the output multiplex means (XS) of the data cell which is present on the input multiplex means (XE), said calculating unit means (UC) having a second output (tdes) connected to a write input of the memory means (MCO) in order to store in the section (S1) of the zone addressed an imaginary time of emission (tde) of the incoming data cell, said imaginary time of emission being calculated by said calculating unit means (UC), clock means for establishing a time basis (BT) and coupled to control at least said memory means (MCO) and said calculating unit means (UC), an output (t) of clock means (BT) being connected to a corresponding input of the calculating unit means (UC), said calculating unit means (UC) delivering the imaginary time of emission (tde) of the last data cell emitted as a function of local time indicated by said time basis, said imaginary time of emission being the sum of the minimum period (pm) and of the maximum duration (dm) respectively stored in the corresponding sections (S1, S2 and S3) of the zone of the memory means (MCO) which is addressed by the incoming data cell, said AND gate (ET) ordering an emission of said data cell in response to a signal at a control input of the AND gate (ET), and said calculating unit means calculating an imaginary time of emission (tdes) of said incoming data cell in order to store it in the corresponding section (S1) of the zone addressed by the said data cell.

6. A circuit according to claim 5, wherein said calculating unit means (UC) comprises an adder (ADD1), said adder having a first input and a second input which respectively receive a signal of the imaginary time of emission of the last emitted data cell (tde) and the signal (pm) which are delivered by the memory means (MCO) which is addressed by the virtual circuit number of the incoming data cell, which is said adder (ADD1) having an output, a comparator (CMP1), a multiplexer (MXI), connected to a first input of said comparator (CMP1), means for applying a threshold time signal of the incoming data cell (t+dm) to a second input of said comparator, the output of the comparator (CMP1) being connected through a terminal of Rej of the calculating unit means (UC) to a control input of the AND gate (ET), the output of the comparator (CMP1) also being connected to a control input of said multiplexer (MX1), the multiplexer (MX1) having an input which receives from the memory means (MCO) a signal indicating the imaginary time of emission of the last data cell emitted (tde) and an input which receives from the adder (ADD1) a signal (s1), said multiplexer (MX1) having an output connected to a terminal (tdes) of the calculating unit means (UC), said output (tdes) being connected to a write input (e1) of the memory means (MCO) for storing the imaginary time of emission of the incoming data cell.

7. A circuit according to claim 6, further comprising means in the calculating unit means (UC) for calculating the threshold time of the incoming data cell, the threshold calculating means comprising a second adder (ADD2) having two inputs, one of which receives a local time signal (t) and the other of which receives a maximum time limit signal (dm), and said adder (ADD2) has an output which delivers said threshold time signal (t+dm).

8. A circuit according to one of the claims 6 or 7, wherein said calculating unit means (UC) further comprises a second comparator (CMP2) having a first input connected to the output of the first adder (ADD1) and having a second input connected to a clock for generating a time basis (BT) in order to receive therefrom the local time signal (t), a second multiplexer (MX2), said comparator (CMP2) having an output connected to a control input of said second multiplexer (MX2), said second multiplexer having two inputs, one of which is connected to the output of the first multiplexer (MX1) and the other of which is connected to the output of the clock for receiving the time basis (BT) in order to receive therefrom the local time signal (t), and said multiplexer (MX2) having an output which forms a output (tdes) of the calculating unit means (UC).

9. A circuit according to either one of claims 6 or 7, further comprising a second comparator (CMP2), two zero-passage analyses and correction circuits (CMCPZ1, CMCPZ2), each of said comparators (CMP1, CMP2) having inputs which are respectively connected to the outputs of said zero-passage analysis and correction circuits (CACPZ1, CACPZ2), the zero-passage analysis and correction circuit having corresponding inputs which receive the signals to be compared, said correction circuits (CACPZ1, CACPZ2) inverting the most significant bit of each of the signals present at its input when a single one of the signals has passed through zero and the other input is a predetermined distance from the first one.

10. A circuit according to claim 5 further comprising a processor means (PROC), the calculating unit means (UC) comprising an input for receiving an activation signal (Proc) delivered by said processor means (PROC) at times when said calculating unit means is addressing said memory means (MCO), said calculating unit means (UA) having an output (Pe) which delivers a bit P, the value of which is one when the imaginary time of emission of the last stored data cell to be emitted (tde) is earlier by a predetermined period of time than the actual time (t) and which is at zero in all other cases, means for applying said output (Pe) to a write input of memory means (MCO) in order to be able to store said bit P in a section (S4) of the zone addressed, the memory means (MCO) having a read output in order to deliver the said bit (P) stored in the section (S4) of the zone addressed by the said data cell in response to the arrival of an incoming cell, said bit (P) being supplied to a corresponding input of the calculating unit means (UC), means responsive to the bit (P) stored in the zone addressed by the incoming data cell being at zero, the said calculating unit means (UC) to deliver said imaginary time normally calculated (tde, tde +pm) as an imaginary time of emission (tde) of the said incoming data cell, and means responsive to the bit (P) being one for causing the calculating unit means (UC) to deliver the local time (t).

11. A circuit according to claim 8, wherein said bit (P) is supplied to one input of an OR gate (OU), a second input of said OR gate being connected to the output of the second comparator (CMP2), and said OR gate (OU) having an output connected to the control input of the second multiplexer (MX2).

* * * * *